UNITED STATES PATENT OFFICE.

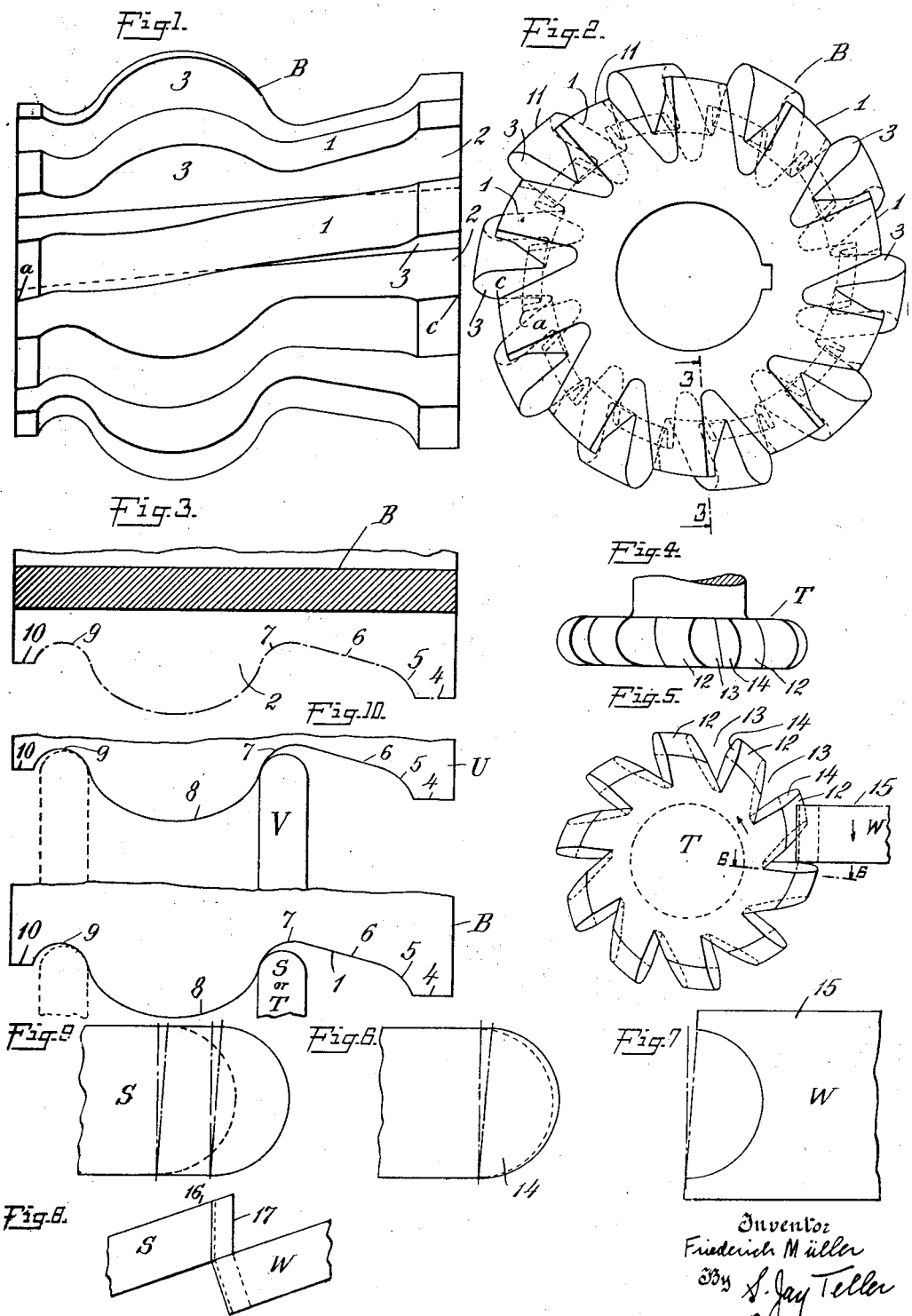
F. MÜLLER.
METHOD OF MAKING MILLING CUTTERS.
APPLICATION FILED JAN. 13, 1919.
1,348,302.
Patented Aug. 3, 1920.
5 SHEETS—SHEET 1.

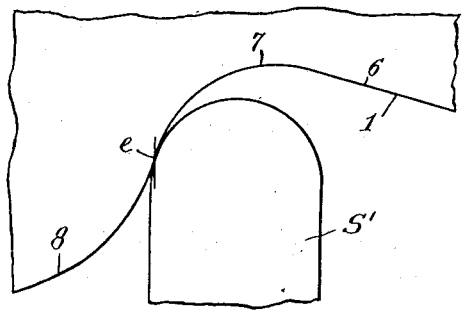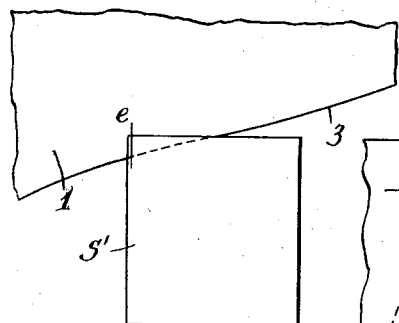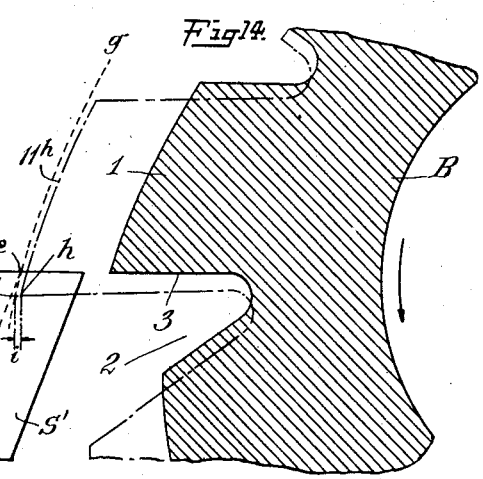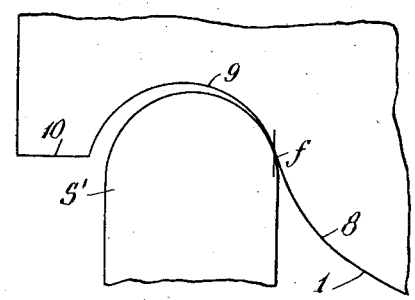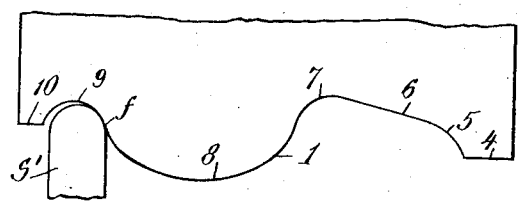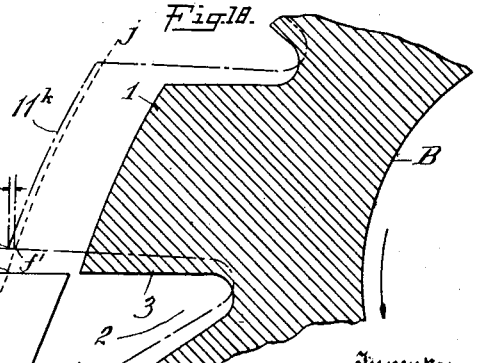

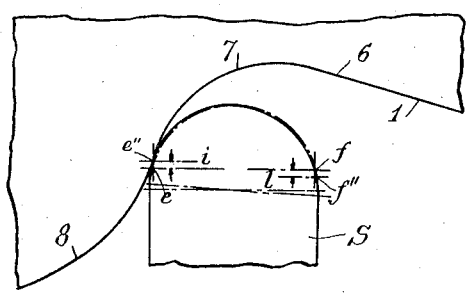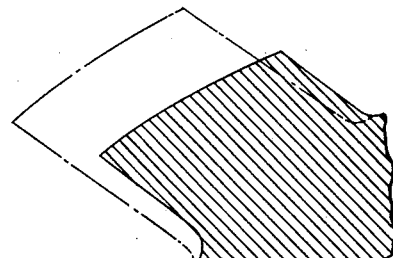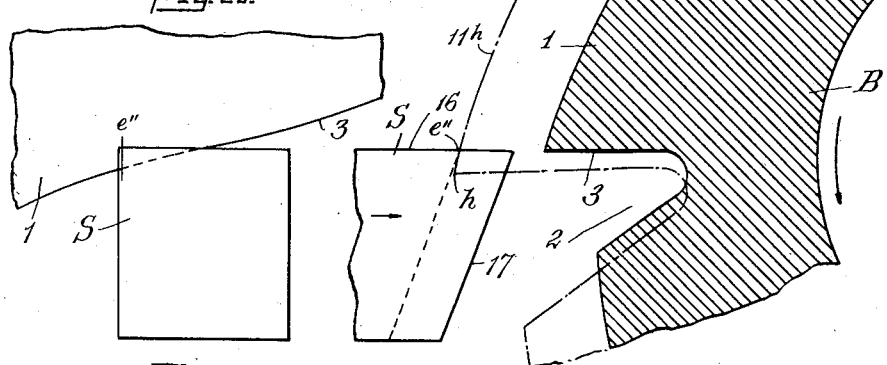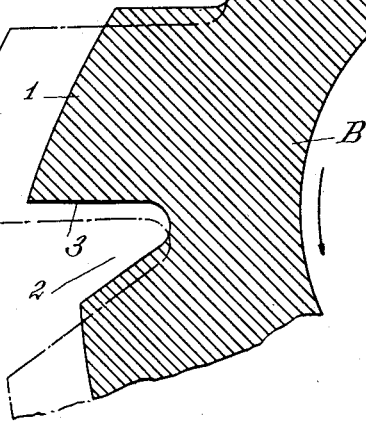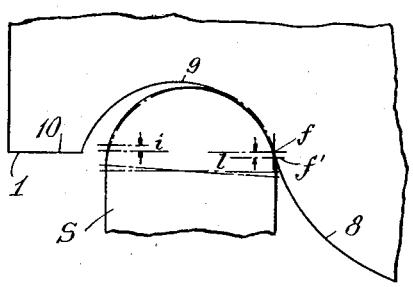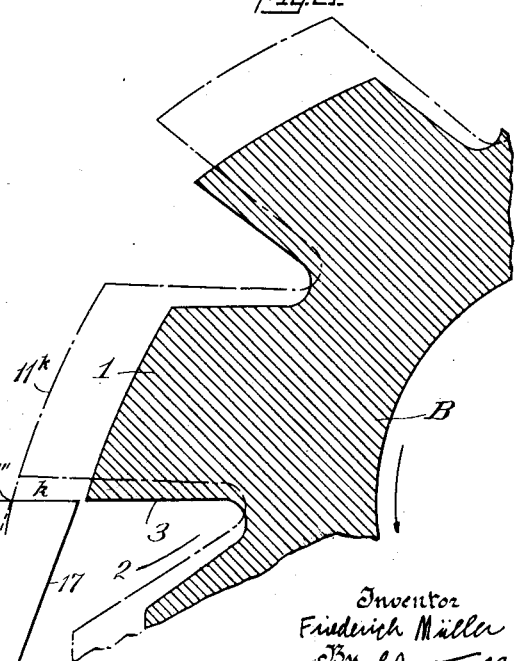

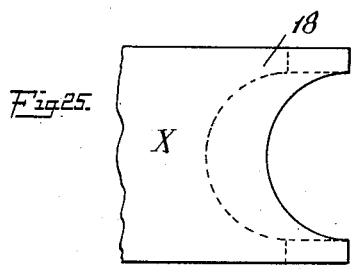
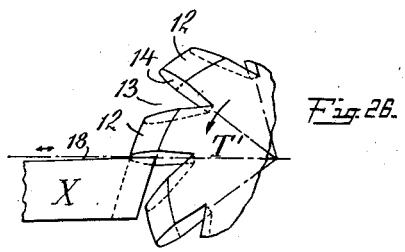
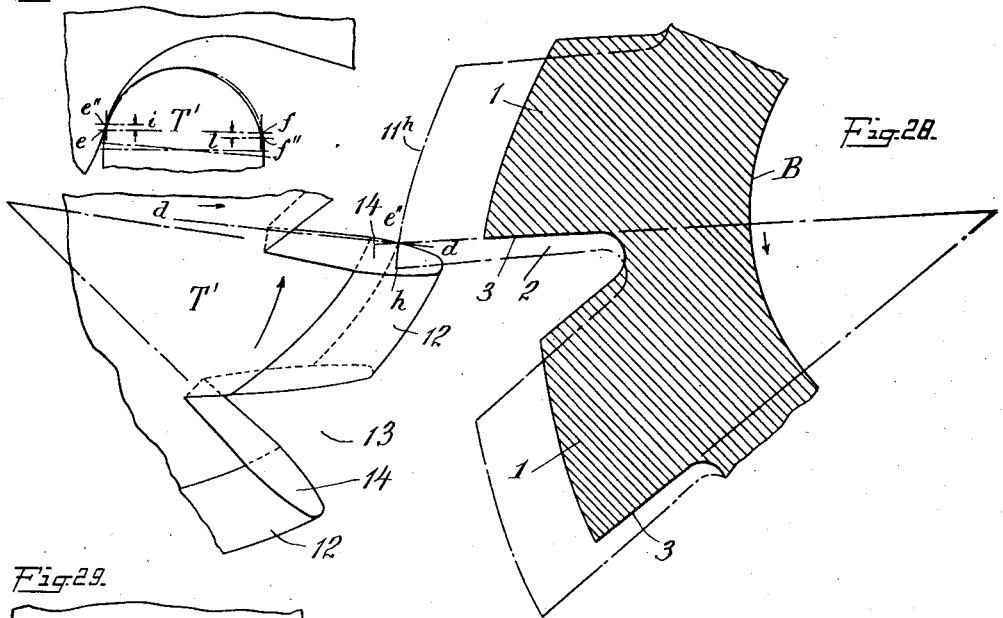
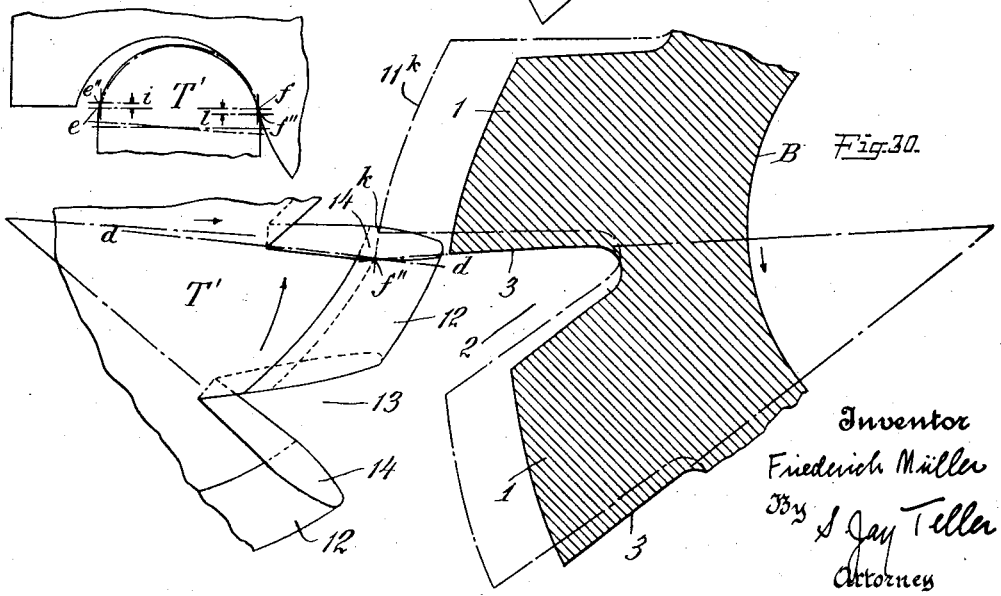

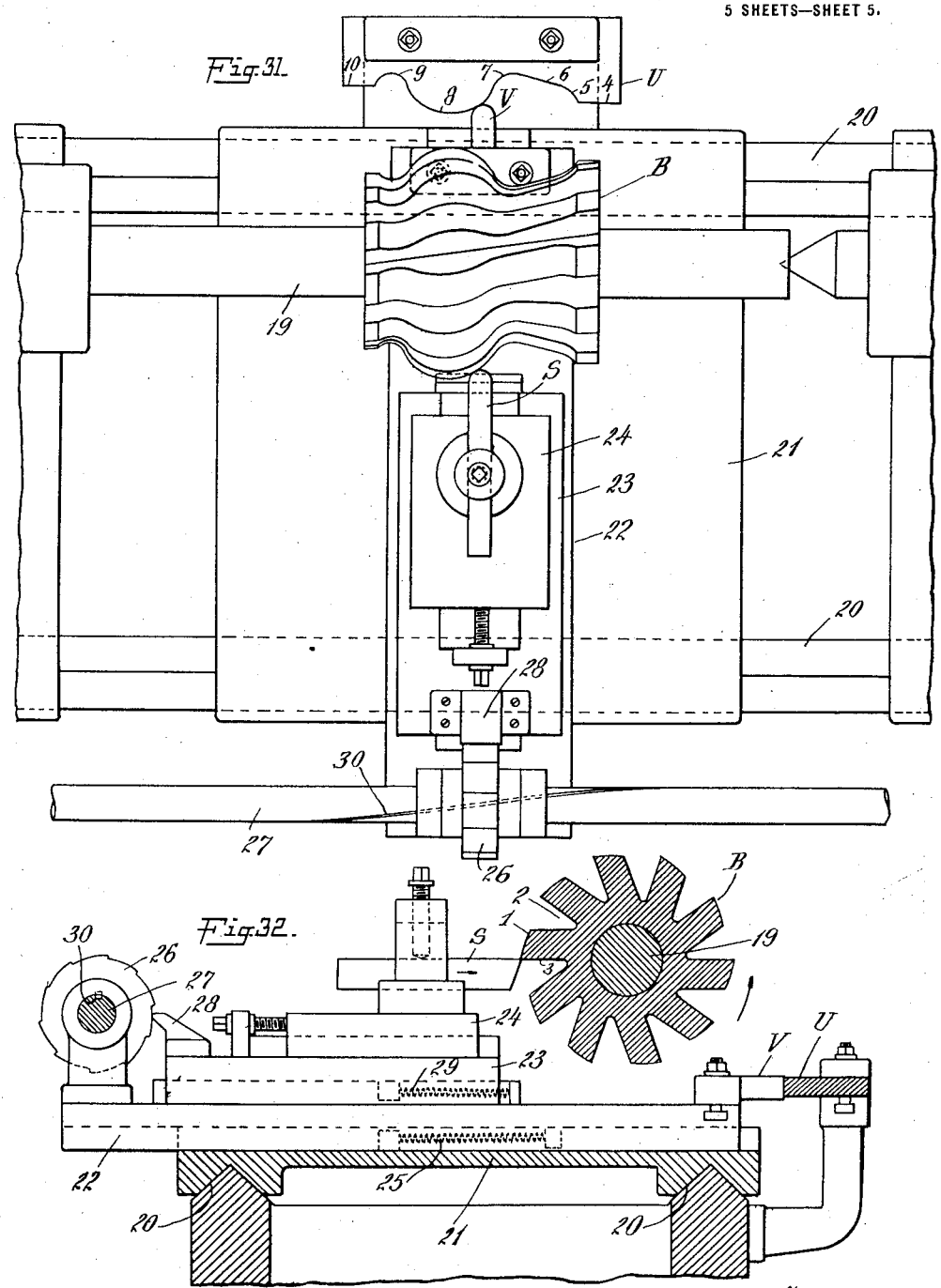

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,302.      Specification of Letters Patent.      Patented Aug. 3, 1920.

Application filed January 13, 1919. Serial No. 270,941.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed December 26th, 1918.

In my copending application for methods of making milling cutters, Serial No. 268,350, filed December 26th, 1918, and in my copending application for methods of making milling cutters, Serial No. 248,190, filed August 3rd, 1918, I have presented two methods of making cutters embodying the invention set forth in my said application Serial No. 268,349. In accordance with the method disclosed in the first said application, Serial No. 268,350, the cutter is formed by means of a preliminary milling cutter or a preliminary lathe tool made with a contour corresponding to that to be formed on the final cutter. The preliminary milling cutter or lathe tool engages the cutter from one end to the other and it is therefore necessary for the teeth of the cutter to be far enough apart to enable the preliminary tool to finish one tooth before engaging the next tooth. In accordance with the method disclosed in the second said application Serial No. 248,190 I avoid the limitations which are incident to the method set forth in the first application. The cutter may have the forward outer corner of each tooth overlapping the opposite rear outer corner of the next tooth. The method involves the use of a fine pointed lathe tool which is guided to follow the desired contour and thus cut the said contour on the cutter.

The present invention relates to a method somewhat similar to that presented in my last said application, Serial No. 248,190, differing, however, in that a relatively broad tool is used instead of a pointed tool. Use is made of the same principle that is used in the method presented in my said application Serial No. 268,350.

As to a part of its subject-matter this application constitutes a continuation of my abandoned application for methods of making milling cutters, Serial No. 248,191, filed August 3rd, 1918.

In order that the method may be clearly understood, I have shown in the accompanying drawings a cutter embodying the invention set forth in the aforesaid application Serial No. 268,349, and I have illustrated two ways in which the method may be practised. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figures 1 and 2 are side and end views respectively of the cutter such as may be made in accordance with the invention.

Fig. 3 is a developed fragmentary cross sectional view, the section being taken through the bottom of one of the longitudinal grooves along a helicoidal surface such as 3—3 indicated in Fig. 2.

Figs. 4 and 5 are plan and end views respectively of a preliminary milling cutter which may be used for forming the shape of the final cutter shown in Figs. 1 and 2. Fig. 5 shows the cutter in operative relation to an intermediate tool.

Fig. 6 is an enlarged diagrammatic view illustrating certain features of the cutter shown in Figs. 4 and 5.

Fig. 7 is an enlarged plan view of the intermediate tool shown in Fig. 5 on the same scale as Fig. 6.

Fig. 8 is a diagrammatic side view illustrating the intermediate tool in use for cutting a lathe tool.

Fig. 9 is an enlarged plan view of the lathe tool on the same scale as Figs. 6 and 7.

Fig. 10 is a diagrammatic plan view illustrating the general method that is followed.

Fig. 11 is a diagrammatic plan view illustrating one step of an incorrect method. A lathe tool is shown in engagement with a cutter blank.

Fig. 12 is an enlarged view of the lathe tool and adjacent parts shown in Fig. 11.

Fig. 13 is a fragmentary front view of the elements shown in Fig. 12. In this view and in succeeding views the angle of inclination of the cutting faces of the cutter is considerably increased.

Fig. 14 is a diagrammatic cross sectional view illustrating the relationship between the lathe tool and the cutter.

Fig. 15 is a view similar to Fig. 11 but showing the lathe tool in a different position.

Fig. 16 is an enlarged view similar to Fig. 12 but showing the lathe tool in the position illustrated in Fig. 15.

Fig. 17 is a view similar to Fig. 13 but showing the lathe tool in the position illustrated in Fig. 16.

Fig. 18 is a view similar to Fig. 14 but showing the lathe tool and the cutter in the position illustrated in Fig. 17.

Figs. 19 to 24 are views corresponding respectively to Figs. 12, 13, 14, 16, 17 and 18 but showing the lathe tool formed as shown in Figs. 4 to 9.

Fig. 25 is an enlarged plan view of a lathe tool adapted to be used for shaping the preliminary milling cutter.

Fig. 26 is a diagrammatic view illustrating a method of shaping the preliminary milling cutter, use being made of the lathe tool shown in Fig. 25.

Fig. 27 is an enlarged plan view somewhat similar to Fig. 19 and showing the relationship between the preliminary milling cutter and the final cutter.

Fig. 28 is a view somewhat similar to Fig. 21, being a diagrammatic cross sectional view illustrating the relationship between the preliminary and final cutters as shown in Fig. 27.

Fig. 29 is a view similar to Figs. 22 and 27 and showing another relationship between the preliminary and final cutters.

Fig. 30 is a view similar to Figs. 24 and 28, being a diagrammatic cross sectional view illustrating the relationship between the preliminary and final cutters as shown in Fig. 29.

Fig. 31 is a diagrammatic plan view of a machine adapted for carrying out the method.

Fig. 32 is a cross sectional view of the machine illustrated in Fig. 31.

In order that the method involving the invention may be clearly understood, I will first describe a cutter such as may be made in accordance therewith. Referring to the drawings, particularly to Figs. 1 and 3 thereof, it will be seen that I have shown a cutter B which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, as shown, the entire teeth 1 are oblique or inclined, and not merely the front cutting faces 3 thereof. As concerns the broader phases of the invention, I do not narrowly limit myself in regard to the nature of the inclination of the teeth 1 or in regard to the character of the front walls or cutting faces 3, but preferably each tooth 1 is generally helical in form and each cutting face 3 conforms to a helicoid. As illustrated in Figs. 1 and 2 the helicoid is one formed by a generatrix following the axis of the cutter and also following a helix on a cylinder concentric with the axis thereof, the helicoid in this case being radial. The character of the helicoid may, however, be varied. The teeth and the cutting faces may be inclined in either direction and the degree of inclination may be varied as required.

The cutter B may be made for cutting any desired practical contour. The contour may be made up of a series of straight lines, or a series of circular arcs, or a combination of circular arcs and straight lines, or the contour may consist in whole or in part of non-circular curves. The cutter shown in Figs. 1 and 2 is adapted for cutting the contour shown in Fig. 3, this contour consisting of a straight section 4 parallel with the axis, a concave section 5 in the form of a circular arc, a straight section 6 inclined with respect to the axis, a concave section 7 in the form of a circular arc, a convex section 8 in the form of an elliptical arc, a concave section 9 in the form of a circular arc, and a straight section 10 parallel with the axis. The grooves 2 can be of any usual or preferred depth or shape as required by the spacing and by the depth of the contour. As illustrated in Fig. 3, each groove 2 has a uniform depth throughout; that is, its bottom is at a uniform distance from the axis of the cutter.

The outer edge of each cutting face 3 has an outline which is shaped to cut the predetermined contour when the cutter is rotated, this outline of the cutting face following the helicoidal surface thereof. All points along the outline must be at their respective correct distances from the center so that when the cutter is rotated they will define the correct predetermined contour. This relationship of the several points along the outline of the cutting face obtains notwithstanding the fact that the cutting face is a warped or helicoidal surface.

Each tooth of the cutter B is relieved along lines 11 extending backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the warped or helicoidal cutting face. Preferably the relief lines 11 are maintained in similar relationship to each other as they extend backward and inward, the lines preferably conforming to spirals of Archimedes. The result is that each tooth of the cutter, at any axial plane of intersection, has a distorted shape, the distortion of shape resulting from the fact that the successive inward inclined relief lines 11 start at different angular positions because of the inclined or helicoidal cutting face. Notwithstanding this distortion in shape at axial planes of intersection, the outline or effective contour at the cutting face is correct, as before stated. When the relief lines 11 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, back of an initial cutting face 3 and similar to the said face, the same effective contour will be found. Therefore if the cutter is ground on the front faces to helicoids which are the same as the helicoids of the initial cutting faces the effective contour will remain the same.

With a relatively long contour such as that shown and with the teeth relatively closely spaced, overlapping occurs to a greater or less extent. The forward outer corner $a$ of each tooth overlaps the opposite rear outer corner $c$ of the next preceding tooth. This overlapping may be even greater than that shown when there is a longer contour, or when there is a greater degree of inclination, or when the teeth are more closely spaced.

The present invention relates to a method of making a cutter such as that set forth and this method will now be described. It will be understood that the preliminary steps of turning the blank and cutting the grooves therein can be carried on in any usual or preferred way, these not of themselves constituting any part of the invention. The invention relates particularly to the method of shaping the blank to properly form and relieve the helical teeth so that they will cut a correct contour.

In my said application Serial No. 248,190 I have described a method involving the use of a narrow lathe tool for shaping the final cutter. While a narrow tool has many features of advantage it may sometimes be preferable to use a wider lathe tool such as S shown in Figs. 8 and 9, or a wider rotating milling cutter such as T shown in Figs. 4 and 5.

In practising the method, the tool S or the cutter T is held in operative relationship with a blank B, as shown in Fig. 10, and is fed and guided, preferably toward the left, so as to follow the true contour 4—10. During the cutting operation the blank is axially rotated by any preferred means. The tool is preferably held in parallelism while being fed, and the feeding is preferably effected uniformly from one end of the blank to the other. For guiding the tool there is provided a former U having exactly the predetermined contour to be cut by the cutter B. The former is engaged by a pin V which has the same or approximately the same front outline as the tool, the shape of the pin as shown being exactly half-round or semi-circular. The former pin is connected with the tool for longitudinal movement in unison therewith. In order that the teeth of the cutter may be properly relieved, the tool or cutter is reciprocated toward and from the blank axis in timed relation to the blank rotation. To enable the tool to properly cut the relief in accordance with the inclined helicoidal cutting face the relative timing of the tool reciprocations is varied in exact proportion to the longitudinal movement of the tool. In this way the tool is so controlled that it always assumes the correct position to engage the edge of a tooth notwithstanding the relative position of the edge is different at different points along the length of the cutter. Fig. 10 shows two different positions of the tool and former pin.

A preliminary milling cutter such as T may be used directly to mill the final cutter, and when a lathe tool such as S is to be used the same or a similar milling cutter T is utilized for making the lathe tool. The cutter T is formed by following a method which is in some respects similar to the method set forth in my aforesaid copending application Serial No. 268,350. Reference can be had to the said application for details and for possible variations not herein set forth.

The cutter T is provided with teeth 12 having grooves 13 between them. The teeth are so formed as to have a suitable convex preferably semi-circular shape at an axial plane of intersection such as 6—6, as shown by dotted lines in Fig. 6. The front or cutting faces 14 of the teeth 12 are helicoidal in form, and are inclined in the same direction as the cutting faces 3 of the final cutter. The helicoidal faces are preferably constructed with the same longitudinal pitch as the helicoidal faces 3 of the final cutter B. The cutter T is smaller in diameter than the final cutter B and therefore the actual inclination of its cutting faces 14 is somewhat less than the inclination of the cutting faces 3 but the cutting faces of both cutters nevertheless conform to similar helicoids, that is, to helicoids having the same longitudinal pitch. Similarly the cutter T is provided with the same degree of relief as that of the final cutter B. Because of the smaller diameter of the cutter T, the actual angle of relief is somewhat greater, but it nevertheless corresponds to similar spirals. The cutter T, constructed as shown and described, has an effective contour shown by full lines in Fig. 6 which is different from the true semi-circular contour.

The cutter T is used to form the shape of the aforesaid lathe tool S, use being made of an intermediate tool W. The milling cutter T is used to mill the intermediate tool W, as shown in Fig. 5, providing the said tool at its cutting face 15 with a distorted contour which is the same as the effective contour of the cutter T shown by full lines in Fig. 6. This distorted contour is illustrated in the plan view in Fig. 7. It will be observed that the tool W is formed without relief, it being fed perpendicularly to its cutting face 15, as indicated by the arrow in Fig. 5.

The intermediate tool W is used, as shown in Fig. 8, for cutting the lathe tool S. The tool S has a cutting face 16 and has its front face 17 inclined with respect to the cutting face to provide the necessary relief. The tool W is set with its cutting face 15 parallel with the cutting face 16 of the tool S, and relative reciprocation is then effected along lines parallel with the front face 17. The result is that the cutting face 16 is formed with a distorted contour which is exactly the same as the distorted contour of the face 15 of the tool W. This distorted contour is shown in Fig. 9, the amount of distortion being indicated by inclined dot-and-dash lines.

I will first describe the method involving the use of the lathe tool S. It has already been stated that the variation in the timing of the relieving movements of the tool occurs in exact proportion to the longitudinal movement of the tool along the contour. With a very narrow tool it may be assumed that the cutting point is fixed with respect to the tool and is at the central plane thereof. But with a tool such as S of considerable width, the cutting point will not be always at the center of the tool and may be at one side of the other thereof in accordance with the shape of the contour to be cut.

Fig. 11 shows a half-round tool S' having a shape exactly the same as that of the former pin V. In this view the cutting point is at $e$ at the left-hand side of the center. Fig. 15 is a similar view and it shows the cutting point at $f$ at the right-hand side of the center. It will be seen that for other positions of the tool, the cutting point would be still differently located, in fact, shifting to different positions on one side and from side to side as the inclination of the contour changes. The variation in the timing of the reciprocating relieving movement takes no account of the shifting of the cutting point, and it is such that the cutting action is correct when the cutting point is at the center of the tool, but is not correct when the cutting point is at one side or the other.

Fig. 12 is an enlargement of a part of Fig. 11, and Fig. 13 is a face view showing the tool S' in the position indicated in Fig. 12, the cutting point being at $e$. In Fig. 13 the degree of inclination of the tooth 1 and the cutting face 3 is considerably increased. The timing of the reciprocating movements is such as to bring the tool S' into its outer position when the central point of the tool is opposite the cutting edge, as shown by the full line section in Fig. 14. The dotted line section in Fig. 14 is taken through the point $e$ and shows that the front face of the tooth reaches the top cutting plane of the tool too soon and that therefore the tool starts to cut too soon at $e'$ and does not reach its normal starting position until after the front face of the tooth has passed. The result is that the tooth is cut with a relief line $e'—g$ which is too high instead of with a correct relief line 11ʰ having a point h at the correct distance from the center of the cutter. The amount of error measured radially is indicated by i.

Fig. 16 is an enlargement of a part of Fig. 15 and Fig. 17 is a face view showing the tool S' in the position indicated in Fig. 16, the cutting point being at f. In Fig. 17 the degree of inclination of the tooth 1 and the cutting face 3 is increased as in Fig. 13. The timing of the reciprocating movements is such as to bring the tool S' into its outer position when the central point of the tool is opposite the cutting edge, as shown by the full line section in Fig. 18. The dotted line section in Fig. 18 is taken through the point f and shows that the front face of the tooth does not reach the cutting plane soon enough. The tool cannot start to cut until the front face of the tooth reaches it, at which time the tool has moved inward to bring the point f to the position f'. The result is that the tooth is cut with a relief line f'—j which is too low instead of with a correct relief line 11ᵏ, having a point k at the correct distance from the center of the cutter. The amount of error measured radially is indicated by l.

It will be understood that similar errors occur at all positions of the tool except where the cutting point is at the tool center. The errors vary in extent in accordance with the inclination of the contour at various points and the result is that an erroneous contour is formed instead of a correct one.

The errors which would arise from the use of a tool such as S' exactly the same in shape as the former pin V are avoided by use of the tool S formed as already described. In using the tool S the same half-round former pin V is retained.

Figs. 19 to 24 correspond respectively to Figs. 12, 13, 14, 16, 17 and 18, the only difference being that the tool S has been substituted for the tool S'. In Figs. 19 and 22 the half-round shape of the tool S' is shown by dot-and-dash lines. The cutting points e and f of the tool S' are indicated and also the corresponding cutting points e'' and f'' of the tool S. It will be observed that the point e'' is farther in toward the axis by the distance i thus correcting the error indicated in Fig. 14, and that the point f'' is farther out away from the axis by the distance l thus correcting the error indicated in Fig. 18.

It will be unnecessary to enter into a detailed description of Figs. 19 to 24 and it will be sufficient to point out that on account of the corrected shape of the tool S the cutting point e'' is at the proper position to engage the tooth at the point h and to cut the correct relief line 11ʰ on the cutter tooth, as shown in Fig. 21. Similarly the cutting point f'' is at the proper position to engage the tooth at the point k and to cut the correct relief line 11ᵏ on the cutter tooth, as shown in Fig. 24.

Under some circumstances, it may be preferable to mill the contour of the cutter. To do this I substitute for the lathe tool S the milling cutter T' as shown in Fig. 26. The milling cutter T' may be the same as the cutter T already described, but it preferably differs in being provided with a small correction, as set forth in my said application Serial No. 268,350. The cutter T' is made with a lathe tool X which is provided at its top cutting face 18 with a concave shape as shown in Fig. 25, which is exactly the same as the convex shape of the former pin V. The lathe tool X is used in a relieving lathe and it is set with its top cutting face in a plane at an angle to a plane through the axis of the cutter, as shown in Fig. 26. When the cutter is being formed it is rotated in the direction of the arrow, the tool X being moved in and out, as indicated by the horizontal arrow, so as to follow the proper relief lines.

Figs. 27, 28, 29 and 30 correspond respectively to Figs. 19, 21, 22 and 24 but show the milling cutter T' substituted for the lathe tool S. Figs. 27 and 29 are to be understood as showing merely the effective contour of the cutter T' rather than any specific part thereof. The milling can be considered as taking place along a plane d—d as indicated. The shape of the teeth of the final cutter is determined as they pass the said plane d—d. The plane is at an angle to a plane through the axis of the cutter B, but the correction shown in Figs. 25 and 26 compensates for this. The effective contour of the cutter T' is therefore the same as the contour of the tool S as shown in Fig. 19. The operation is exactly the same as already described in connection with the tool S and repetition of the description is unnecessary.

I do not herein specifically claim the method involving the use of a preliminary milling cutter directly for milling the final cutter. This method is made the subject of my copending application for methods of making milling cutters, Serial No. 270,942, filed on even date herewith.

In practising the invention use may be made of a machine in some respects similar to that set forth in my copending application for relieving machines, Serial No. 286,524, filed March 31, 1919. The machine is not claimed as a part of the present invention, but in order that the method may be more clearly understood I have illustrated diagrammatically in Figs. 31 and 32 the essential parts of a machine for carrying out the method. It will be understood that, so far as this invention is concerned, the machine construction can be widely varied. As illustrated, 19 is a mandrel upon which is carried a cutter blank B. Suitable means are provided for supporting and rotating the mandrel. Longitudinally movable along ways 20, 20, is a carriage 21 upon which is mounted a transversely movable slide 22. Carried by the slide 22 is an independently movable transverse slide 23 which carries the tool S or the cutter T', the tool S being shown. There is preferably an intermediate slide 24 by means of which preliminary adjustments of the tool or cutter may be effected. Secured to the slide 22 is the former pin V which has already been described. Secured to the main frame of the machine is the former plate U. A spring 25 is provided for pressing the slide 22 toward the rear and thus holding the former pin V always in engagement with the former U. It will be seen that when the carriage 21 is moved longitudinally the slide 22 will be caused to move transversely under the guidance of the former, the tool S thus being caused to develop an outline which is exactly the same as that of the former U.

A cam 26 is splined to a shaft 27 which is rotatably mounted on the slide 22. The cam 26 and the shaft 27 are bodily movable in accordance with the transverse movements of the slide 22. When the slide 22 moves longitudinally with the carriage 21 the cam 26 moves along the shaft, the shaft itself being fixed against longitudinal movement. Thus the cam 26 partakes of all of the bodily movements of the slide 22. A finger 28 secured to the slide 23 engages the cam and a spring 29 is provided for pressing the slide 23 outward, thus holding the finger 28 against the cam. Suitable means, not fully shown, are provided for rotating the shaft 27 in timed relation with the mandrel 21, the shaft being given one complete rotation for each rotation of the blank B. Thus the tool S is reciprocated. In order to effect the aforesaid variation in the timing of the relieving movements, the groove or keyway 30 of the shaft 27 is helical in form and has the same degree of inclination, that is, the same longitudinal pitch, as the teeth of the blank B. The result is that when the tool S is moved longitudinally of the blank the cam 26 is moved along the shaft 27. On account of the helical keyway the cam not only partakes of the normal rotative movement of the shaft but is given a supplemental rotative movement, this supplemental movement being exactly correct in amount to cause the tool, when in its outermost operative position at each reciprocation, to engage the front edge of a tooth of the cutter.

In operation, a former U is selected having exactly the predetermined contour, and a former pin U is selected which has a cross sectional shape bearing the described relation to that of the tool S that is to be used. A blank B is put in place, as shown, this blank having previously been roughed out and grooved in any usual or preferred way. By means of the slide 24 the tool is adjusted into engagement with the blank at its right-hand end and the movement of the machine is started. The blank B rotates and the tool is given a reciprocating movement to effect the relief. By means of the carriage 21 the tool is fed slowly toward the left, the rotative movement of the blank and the reciprocating movement of the tool being continued. By means of the former and the former pin, the slide 22 is moved inward and outward but, because the cam 26 is movable with the slide, the reciprocating relieving movements of the tool S are continued without interruption. Inasmuch as the cam 26 moves longitudinally along the shaft 27 as the tool is fed, the reciprocating and relieving movements of the tool are slightly accelerated, thus causing the tool to engage the blank at the proper times notwithstanding the inclination of the cutting faces thereof.

The former U can have any desired practical contour, no matter how irregular, and thus any desired practical contour, no matter how irregular, can be given to the finished cutter B. It will be seen that in accordance with my invention it is possible to construct a cutter with any desired effective contour without the use of any specially constructed cutting tools. The same tool S or cutter T' may be used for various contours, it being merely necessary to provide formers having the contours desired for the cutters.

What I claim is:

1. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a cutting tool having an effective shape different from that of the former pin but related thereto in a predetermined way, and in cutting the contour of the relieved final milling cutter by means of the cutting tool, the tool being guided by the said former and former pin to develop the predetermined contour and being reciprocated in timed but varying relation to the rotation of the blank to provide the required relief.

2. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a non-rotary cutting tool having a shape different from that of the former pin but related thereto in a predetermined way, and in cutting the contour of the relieved final milling cutter by means of the cutting tool, the tool being guided by the said former and former pin to develop the predetermined contour and being reciprocated in timed but varying relation to the rotation of the blank to provide the required relief.

3. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a cutting tool having an effective shape different from that of the former pin, the difference in shape being dependent on the degree of inclination of the cutting faces of the final cutter, and in cutting the contour of the relieved final milling cutter by means of the cutting tool, the tool being guided by the said former and former pin to develop the predetermined contour and being reciprocated in timed but varying relation to the rotation of the blank to provide the required relief.

4. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a cutting tool having an effective shape different from that of the former pin, the difference in shape being dependent on the required degree of relief of the teeth of the final cutter, and in cutting the contour of the relieved final milling cutter by means of the cutting tool, the tool being guided by the said former and former pin to develop the predetermined contour and being reciprocated in timed but varying relation to the rotation of the blank to provide the required relief.

5. The herein described method of shaping a spirally relieved milling cutter having helicoidal cutting faces adapted to cut a predetermined contour other than a straight line, the method consisting in axially rotating a blank having teeth with helicoidal front faces, in forming a preliminary cutter having the predetermined shape at planes of intersection transverse to the lines of cutting and provided with a cutting face with a degree of inclination the same as that of the helicoidal cutting faces of the final cutter and provided with a degree of relief the same as that of the teeth of the final cutter, in providing a former having the predetermined contour of the final cutter and a companion former pin having the same shape as the said cross sectional shape of the preliminary cutter, and in forming the shape of the relieved final milling cutter from the said preliminary cutter, use being made of the said former and former pin to develop the predetermined contour and relative reciprocation being effected in timed but varying relation to the rotation of the blank to provide the required relief.

6. The herein described method of shaping a spirally relieved milling cutter having helicoidal cutting faces adapted to cut a predetermined contour other than a straight line, the method consisting in axially rotating a blank having teeth with helicoidal front faces, in forming a preliminary milling cutter having a predetermined shape at axial planes of intersection and having its teeth provided with helicoidal cutting faces with a longitudinal pitch the same as that of the helicoidal cutting faces of the final cutter and provided with a degree of spiral relief the same as that of the teeth of the final cutter, in providing a former having the predetermined contour of the final cutter and a companion former pin having the same shape as the said cross sectional shape of the preliminary cutter, and in forming the shape of the relieved final milling cutter from the said preliminary cutter, use being made of the said former and former pin to develop the predetermined contour and relative reciprocation being effected in timed but varying relation to the rotation of the blank to provide the required relief.

7. The herein described method of shaping a spirally relieved milling cutter having helicoidal cutting faces adapted to cut a predetermined contour other than a straight line, the method consisting in axially rotating a blank having teeth with helicoidal front faces, in forming a preliminary milling cutter having a predetermined concave shape at axial planes of intersection and having its teeth provided with helicoidal cutting faces with a longitudinal pitch the same as that of the helicoidal cutting faces of the final cutter and provided with a degree of spiral relief the same as that of the teeth of the final cutter, in shaping a non-rotary cutting tool with the preliminary milling cutter, in providing a former having the predetermined contour of the final cutter and a companion former pin having the same shape as the said cross sectional shape of the preliminary cutter, and in cutting the contour of the relieved final milling cutter by means of the cutting tool, the tool being guided by the said former and former pin to develop the predetermined contour and being reciprocated in timed but varying relation to the rotation of the blank to provide the required relief.

In testimony whereof I hereto affix my signature.

FRIEDERICH MÜLLER.